US009060320B1

(12) United States Patent
Cairns et al.

(10) Patent No.: US 9,060,320 B1
(45) Date of Patent: Jun. 16, 2015

(54) IDENTIFYING TRAPPING ACCESS POINTS (75) Inventors: Ryan T. Cairns, Los Altos, CA (US);
Trond T. Wuellner, Mountain View, CA (US)

(73) Assignee: Google Inc., Mountain View, CA (US)

(\*) Notice: Subject to any disclaimer, the term of this patent is extended or adjusted under 35 U.S.C. 154(b) by 243 days.

(21) Appl. No.: 13/300,538

(22) Filed: Nov. 18, 2011

Related U.S. Application Data

(60) Provisional application No. 61/415,343, filed on Nov. 18, 2010.

(51) Int. Cl.
*H04W 48/00* (2009.01)
*H04W 48/20* (2009.01)
*H04L 29/06* (2006.01)

(52) U.S. Cl.
CPC .............. *H04W 48/00* (2013.01); *H04W 48/20* (2013.01); *H04L 63/101* (2013.01)

(58) Field of Classification Search
USPC .......................................................... 370/331
See application file for complete search history.

(56) References Cited

U.S. PATENT DOCUMENTS

| 6,393,484 | B1  | 5/2002  | Massarani |           |
|-----------|-----|---------|-----------|-----------|
| 7,068,999 | B2  | 6/2006  | Ballai    |           |
| 2003/0142641 | A1\* | 7/2003 | Sumner et al. | 370/328 |
| 2004/0198392 | A1 | 10/2004 | Harvey et al. | |
| 2006/0047801 | A1 | 3/2006 | Haag et al. | |
| 2007/0025334 | A1\* | 2/2007 | Meyer | 370/352 |
| 2007/0058598 | A1\* | 3/2007 | Ling | 370/338 |
| 2007/0180244 | A1\* | 8/2007 | Halasz et al. | 713/168 |
| 2009/0013073 | A1\* | 1/2009 | Chaskar et al. | 709/224 |
| 2010/0246416 | A1\* | 9/2010 | Sinha et al. | 370/250 |
| 2010/0322214 | A1\* | 12/2010 | Workman et al. | 370/338 |
| 2012/0300746 | A1\* | 11/2012 | Ibrahim et al. | 370/331 |
| 2014/0036841 | A1\* | 2/2014 | Gray | 370/329 |

OTHER PUBLICATIONS

Ghazisaeedi and Zokaei. "Traffic Balancing with Dynamic Access Point Selection in WLANs." *International Journal of Web Applications*, vol. 1, No. 3, Sep. 2009, pp. 157-164.
Nicholson et al. "Improved Access Point Selection" in: *Proceedings of the 4th International Conference on Mobile Systems, Applications and Services* (New York, ACM, 2006), pp. 233-245.
Pang et al. "Wifi-Reports: Improving Wireless Network Selection with Collaboration." International Conference on Mobile Systems, Applications, and Services, Krakow, Poland, Jun. 2009, 14 pages.
Vaughan-Nichols. "The Challenge of Wi-Fi Roaming." *Computer*, vol. 36, Issue 7, Jul. 2003, pp. 17-19.

\* cited by examiner

*Primary Examiner* — Chirag Shah
*Assistant Examiner* — Srinivasa Reddivalam
(74) *Attorney, Agent, or Firm* — Fish & Richardson P.C.

(57) ABSTRACT

A computer-implemented network node selection method includes identifying a plurality of operable wireless network access points within communication range of a wireless device connected to a mobile computer; identifying which of the operable wireless network access points is arranged to trap a requesting device in a proxy; and affecting a manner in which prospective wireless network access points are presented to a user of the mobile computer based on the identifying of which of the operable wireless network access points is arranged to trap a requesting party in a proxy.

20 Claims, 8 Drawing Sheets

IDENTIFYING TRAPPING ACCESS POINTS

CROSS-REFERENCE TO RELATED APPLICATION

This application claims the benefit of U.S. Provisional Patent Application Ser. No. 61/415,343 filed 18 Nov. 2010, the disclosure of which is hereby incorporated by reference in its entirety.

TECHNICAL FIELD

This document relates to systems and techniques for operating a computer operating system, including for applying security efforts in a browser-based operating system.

BACKGROUND

The core structures by which a computer (e.g., a desktop PC, laptop, netbook, or smart phone) operates may include a basic input and output system, or BIOS, an operating system, and other components that may be referred to as occupying a "stack" of software that provides basic functionality for operating a computer. The BIOS may be accessed when a computer is first turned on and booted, and can provide basic functionality for the computer, such as identifying, testing, and initializing system devices, including storage devices that store code that is further needed to boot the computer. The code for the operating system can be stored on such an additional device, and can provide for further booting of the computer until it is fully booted and ready to operate.

An operating system generally serves as an interface between the computer hardware and a user of the computer. An operating system may provide a variety of functions. For example, the operating system can provide a graphical user interface (GUI) by which a user of the computer may receive output from the computer and may provide input to the computer. The operating system may also provide a platform on which various third-party applications execute, where the operating system provides services that are needed by the applications, and also provides the mechanism by which the applications can communicate with other resources, such as other applications, peripheral devices (e.g., printers, cameras, etc.), and with services provided by the operating system itself.

SUMMARY

This document describes systems and techniques that may be implemented as part of an operating system for a computing device, or in a system that includes a number of different computing devices. The operating system may be particularly implemented so as to interact with network-based resources, such as so-called "cloud" computing resources. For example, the operating system may provide for native network-based file storage and peripheral access, as well as access through the cloud to printers and other peripherals.

The operating system may be designed to be secure. For example, an identified number of applications may be the only applications that may have native access to the operating system. For example, the only native application may be a browser that runs in the operating system. Other applications may be applications, in the form of web apps that run inside the browser. Each of the web applications may be sandboxed from each other and may execute in name spaces that are separate from each other, and the browser may execute in its own name space. The operating system may prevent any other applications from residing at the native level.

Because the operating system may prevent changes to the system data by a user, such as by the installation of new applications, the operating system may implement a number of security mechanisms based on such preventing of changes. For example, all or some of the systems components may be hashed using a particular key when they are first provided on a device, and the resulting hash value may be compared against hash values created every time the device is booted, so as to confirm that the system resources have not surreptitiously changed in the meantime.

In certain implementations discussed below in particular detail, a computing device may provide mechanisms for connecting to wireless access points in a network, such as WiFi access points. For example, certain access points serve as proxy traps, in that they do not advertise themselves as requiring a password when they are scanned by a client device, but also do not permit free access to network resources such as access to the internet. Rather, when a user attempts to connect with such an access point, the user is prompted to provide payment information in order to access network resources such as the internet and World Wide Web. To avoid such problems, it is described below that a device may check access points that do not show up as locked, as part of a scanning operation, by automatically submitting a request that has a known response if the request is passed to a network like the internet. For example, the device may automatically submit a URL to the access point as part of an HTTP request, as if the HTTP request came from a user employing a browser on the device. The URL may be directed to a site having known, and preferably unchanging content, so that if the device determines that it has received such content in response to the request, the device may determine that the particular access point is not a proxy trap. For example, the URL may be directed to a known 404 page because such pages do not change often and are generally "light," in that they will not pass much content through the access point and network.

In certain implementations, a computer-implemented network node selection method is disclosed that comprises identifying a plurality of operable wireless network access points within communication range of a wireless device connected to a mobile computer; identifying which of the operable wireless network access points is arranged to trap a requesting device in a proxy; and affecting a manner in which prospective wireless network access points are presented to a user of the mobile computer based on the identifying of which of the operable wireless network access points is arranged to trap a requesting party in a proxy. Identifying the plurality of operable wireless network access points can comprise simultaneously connecting to two different wireless network access points using different communication chip cores on the mobile computer. Also, identifying which of the operable wireless network access points is arranged to trap a requesting device in a proxy comprises sending a network request to a first access point and determining whether the request passed through the access point to a resource on the internet. Moreover, wherein the network request can comprise an HTTP request to a known network site, and identifying which of the operable wireless network access points is arranged to trap a requesting device in a proxy comprises determining whether a responses to the HTTP request is valid.

In some aspects, a response is determined to be valid if the response contains content known to exist at the known network site. The method can also comprise scanning the plurality of operable network access points to identify access points that require user credentials, and sending a non-scanning request only to access points identified as not requiring user credentials. Moreover, affecting the manner in which prospective wireless network access points are presented comprises suppressing a display of any wireless network access points identified as being arranged to trap a requesting party in a proxy, and affecting the manner in which prospective wireless network access points are presented can comprise displaying wireless network access points identified as being arranged to trap a requesting part in a proxy using an icon that is different than an icon used for displaying wireless network access points that are not identified as being arranged to trap a requesting part in a proxy. The method can also comprise identifying one or more additional access limits on at least some of the plurality of operable wireless network access points, and displaying on the mobile computer an indication that represents the identified one or more additional access limitations. In addition, the method can include receiving a user input with respect to an icon for a wireless network access point and displaying the indication that represents the identified one or more additional access limitations in response to receiving the user input. And in other aspects, the method further comprises receiving a user input with respect to an icon for a wireless network access point and displaying detailed information about access restrictions on the wireless network access point in response to receiving the user input.

In another implementation, a computing device for selecting wireless access nodes is disclosed. The device comprises a wireless interface having circuitry for identifying a plurality of operable wireless network access points within communication range of a the computing device; a display having an area for listing one or more wireless access points within a range of the wireless interface; a request generator programmed to provide, through the wireless interface, a request to a resource on a publicly accessible network; and a tester programmed to obtain information received from the request provided by the request generator and to determine whether the received information indicates that that the request passed through a wireless access point in a manner to indicate that the wireless access point permits open access to the internet. One chip core can be arranged to perform communications through one access point while another chip core scans for other available access points. Also, the tester can be programmed to generate a network request that comprises an HTTP request to a known network site, and to identify which of one or more operable wireless network access points is arranged to trap a requesting device in a proxy by determining whether a responses to the HTTP request is valid. In some aspects, a response is determined to be valid if the response contains content known to exist at the known network site.

In yet other examples, the interface is arranged to scan the plurality of operable network access points to identify access points that require user credentials, and to send a non-scanning request only to access points identified as not requiring user credentials, and the display controller is arranged to, in cooperation with the tester, suppress a display of any wireless network access points identified as being arranged to trap a requesting party in a proxy.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for providing an operating system in a lightweight manner to computing devices that spend all or almost all of their time connected to the internet.

Figure 1:
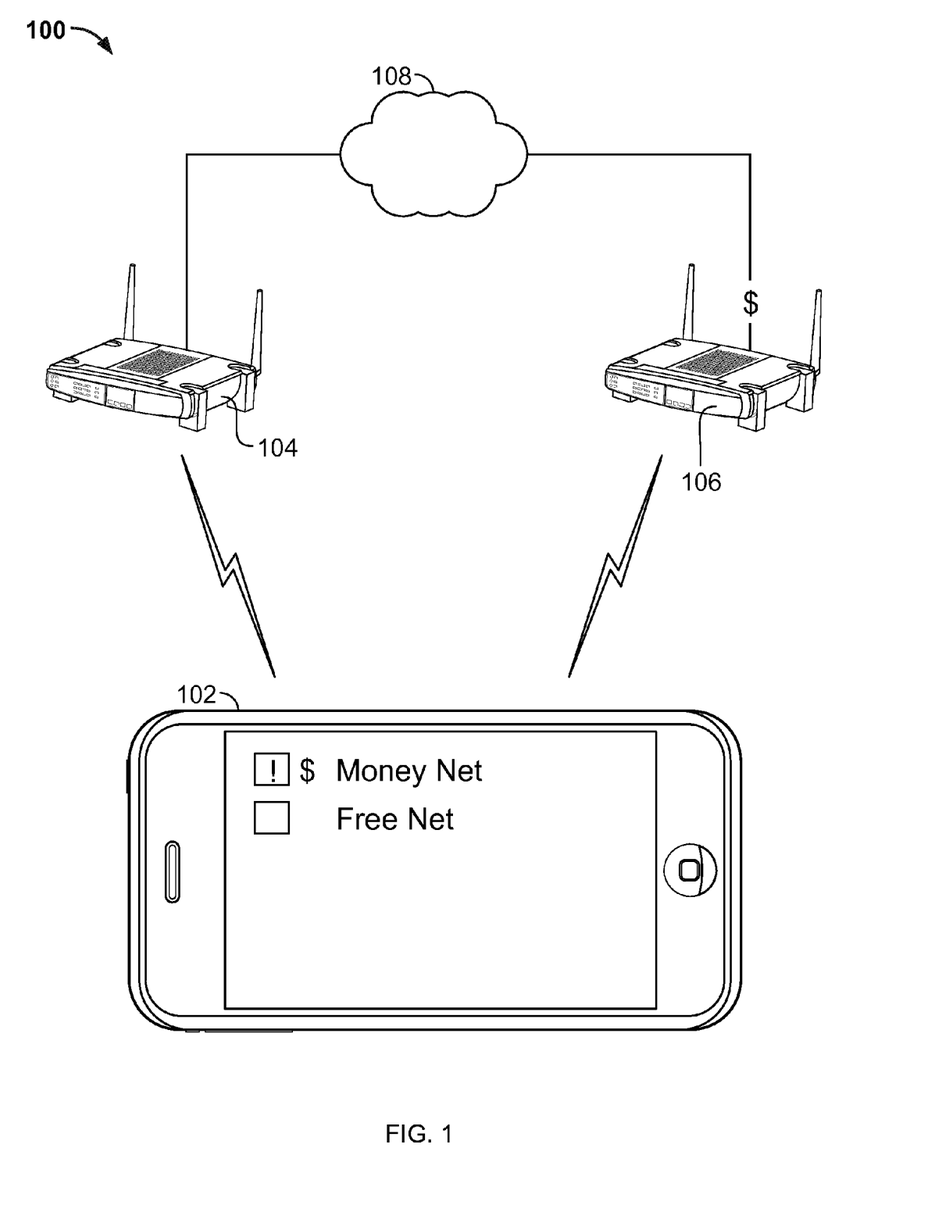
FIG. 1 is a schematic diagram of a computer network having multiple available wireless access points.

FIG. 1 is a schematic diagram of a computer network 100 having multiple available wireless access points. In general, the network 100 is a common form of network that may being countered in various public locations. In particular, two different wireless access points 104, 106 are shown and may be located in a public location where a user of a portable computing device 102 may communicate electronically through the access points 104, 106. The access points 104, 106 may in turn communicate through the Internet 108 and other networks so as to provide information to a user of the device 102 in various familiar manners. For example, a user of the device 102 may surf the web, watch videos, send and receive e-mail and other messages, and perform various other activities made possible through an Internet connection at a basic level of provided software.

In this example, access point 106 is a device that does not give free access to a user of device 102 or other devices, but instead acts as a proxy to the user of device 102 and may require payment or other negative actions on the part of the user 102 before the user may obtain full access to the Internet and other services. As a result, the device 102 in this example is programmed to identify such access points, and to notify a user of the device 102 about the presence of such access points. Thus, in this example, labels for each of the two access points showing the related network name for the access point are provided on device 102's display. Also, icons are shown next to the labels to indicate whether any of the networks involves a hotspot that is likely to trap the device 102 in a proxy or that have other limits. For example, to indicate that the money net network, which is associated with the device 106, is such a hotspot or access point, an exclamation point Is shown in the icon next to that network, and a dollar sign is also shown.

Using such techniques, a user of device 102 may be immediately notified about the presence of networks in an area, and may also be notified whether the networks have particular limitations. As a result, the user can intelligently select to connect to one or other of the networks.

Figure 2:
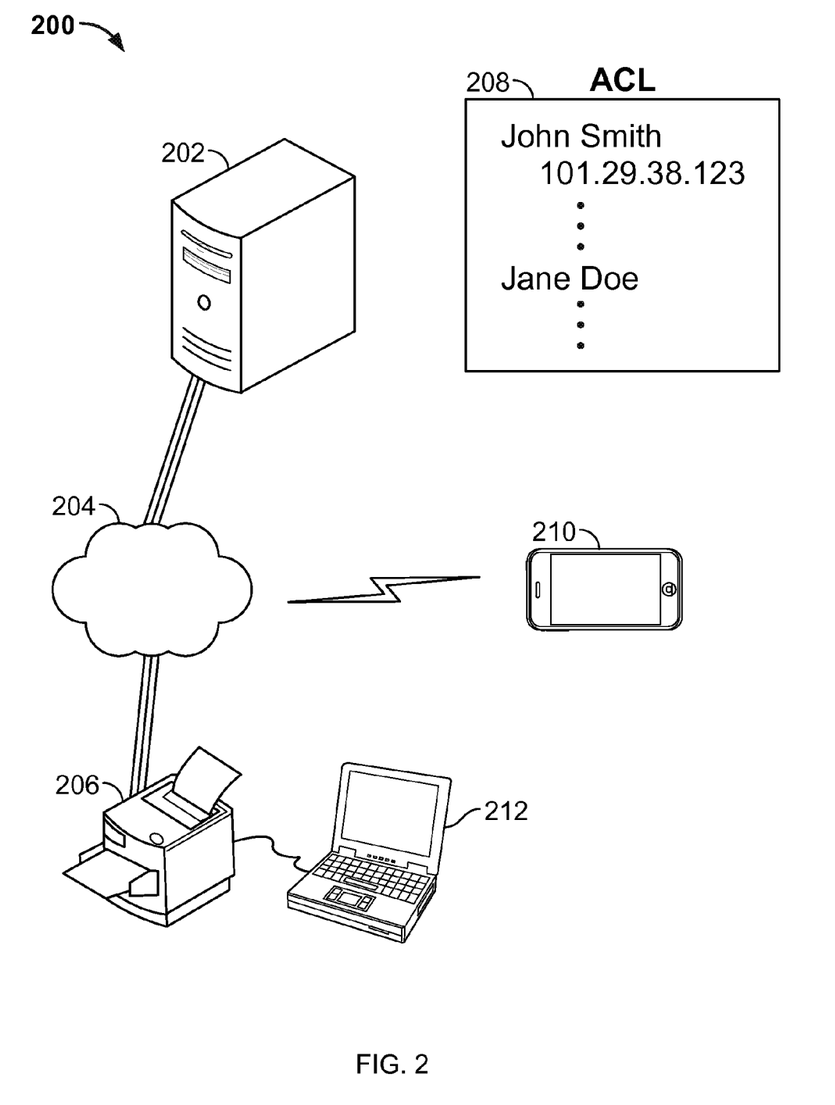
FIG. 2 shows a network for mediating access to a peripheral device.

FIG. 2 shows a network for mediating access to a peripheral device. In general, the system involves an access control list 208 that is stored by a public web accessible server system 202. The server system 202 may provide a variety of public services, such as search services, e-mail services, and mapping services and other services that may be accessed by computing devices through the Internet 204. In this example, a mobile computing device 210 is communicating through the Internet 204 in an attempt to supply a print job to a network connected printer 206. Such an attempt to provide printing to the printer 206 may be mediated by the server system 202. For example, the device 210 may submit to the server system 202 an identifier for itself or its user, and an identifier for the printer 206, such as an IP address for the printer 206. The server system 202 may then check such identifiers against an access control list 208. The server system 202 may thus be in charge of determining what devices may print on the printer 206.

Various users may be provided with rights to the printer 206 in a variety of convenient yet secure manners, so that strangers are not able to print to a printer and waste paper or otherwise interfere with the rightful use of the printer 206. For example, laptop computer 212 is shown in this example having a wired connection to printer 206. When such a connection has been made, laptop computer 212 may obtain information from printer 206, and may relay the information to server system 202. Such information may indicate that the computer 212 is in a trusted relationship with respect to the printer 206. As a result, in such a configuration, a user of computer 212 may be allowed to change the access control data of the access control list 208. Thus, for example the user of computer 212 may log in and indicate that another user should have access to printer 206. The user of computer 212 may, for example, provide an e-mail address of the other user, and the server system 212 may store the address and may check the address against subsequent requests to print to printer 206.

Figure 3:
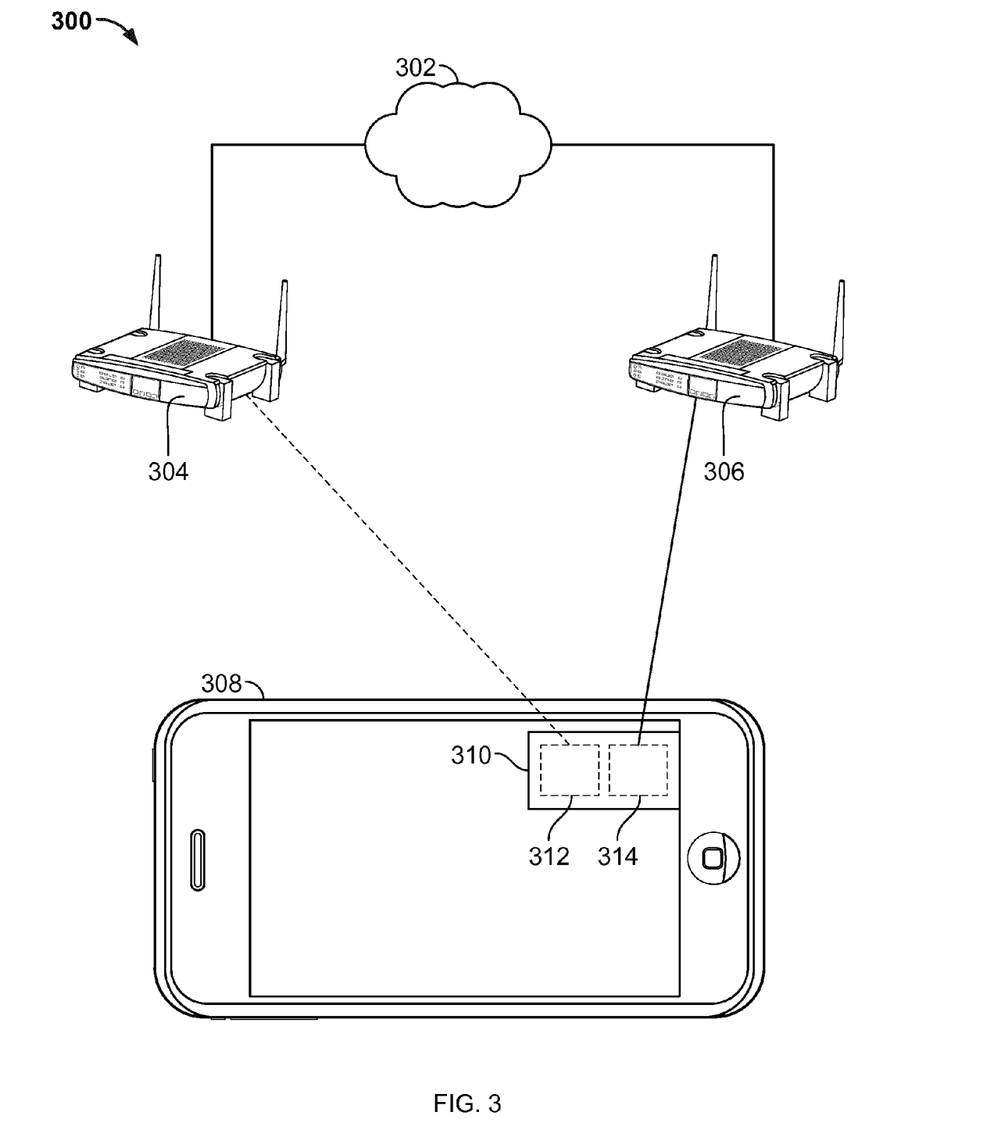
FIG. 3 is a schematic diagram of a system for making multiple network connections simultaneously.

FIG. 3 is a schematic diagram of a system for making multiple network connections simultaneously. In general, the system 300 here is similar to that shown in FIG. 1, though in this case there may be nothing wrong with access point 304 or access point 306 that communicate through Internet 302. Instead, a user of device 308 may be pleased with the wireless service that he or she is being but may nonetheless be always interested in finding better service. As a result, the device shown in this example is shown as including a first wireless interface 312 and a second wireless interface 314. The wireless interfaces 312, 314 may generally operate independently of each other. As such, while interface 314 is connected to access point 306, as shown by the solid line, it may also be steadily communicating to pass data between, interface 312 is busy attempting to find a connection that is better than the connection for interface 314. For example, in this instance, the interface 312 is clear re-access 300 4.5 capabilities of axes one 304 and to ensure that access through access 304 is free. In this manner, the device 308 may readily identify other networks in an area even though it is already connected to and communicating with another network.

Each of wireless interfaces 312 and 314 in this example are part of a single chipset or die, and thus may be implemented at a relatively low cost and may be arranged so as to coordinate with each other in a more complete manner. For example, a chipset manufacturer may provide a module to a maker of mobile devices for including the chipset or other package into a device such as device really.

Figure 4A:
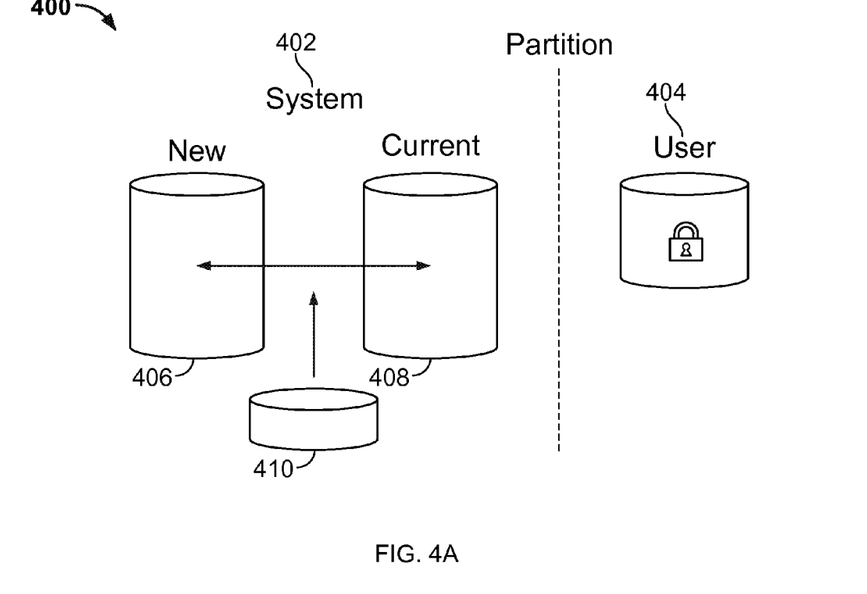
FIG. 4A is a system for maintaining security in a partitioned operating system.

FIG. 4A is a system for maintaining security in a partitioned operating system. In general, the operating system here is highly secure by maintaining boundaries between different parts of the operating system.

In this example, the main portion of the operating system is partitioned between system components 402, and user components 404, such as in the form of user data. The user components 404 are shown in their own partition, and also encrypted for security purposes. On the other side, the system components 402 are shown and are in the process of being updated between a current 408 and new 406 version of the resources. In performing such an update, the system 400 may first check to determine that the new resources are authentic. The system 400 may then determine, such as using components 410, what changes have been made in the current resources 408, and may then modify the new resources 406 accordingly, and make the new resources the current, active resources. The determination that the new resources 406 are authentic may be made, for example, by obtaining a hash key provided by a publisher of the resources 406, and may then execute a hash on the new resources 406 to determine that the result matches the hash key from the legitimate copy of the resources.

Figure 4B:
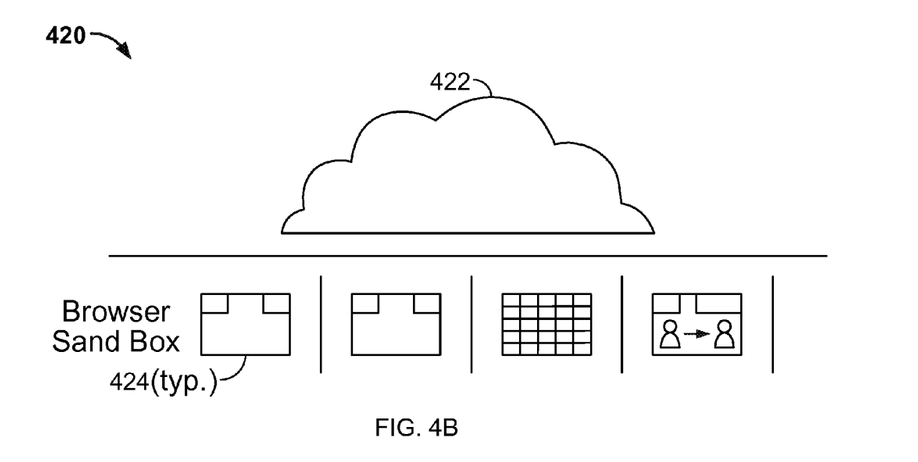
FIG. 4B shows a highly sandboxed operating system architecture.

FIG. 4B shows a highly sandboxed operating system architecture. In general, the operating system 420 shown here is in the form discussed above, where a single native application in the form of a Web browser is provided in an operating system. A number of web applications such as application 424 are shown here below a representation of a cloud 422. The representation indicates that each of the applications is a Web application and communicates extensively with cloud-based services such as hosted data services. In this example also, each of the icons showing one of the Web applications includes a tab to indicate that each of the applications corresponds to a tab or pane in the browser. Each of the applications is part of a browser sandbox, and each is also sandbox away from the others of the Web applications.

Figure 5A:
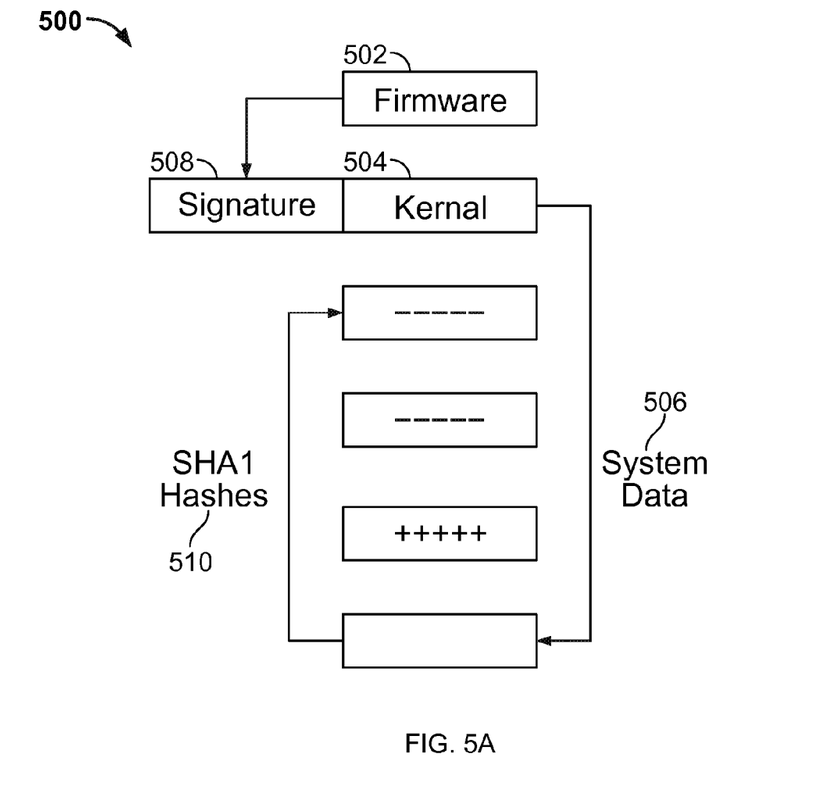
FIG. 5A shows a schematic diagram of a technique for maintaining security in an operating system at boot time.

FIG. 5A shows a schematic diagram of a technique for maintaining security in an operating system at boot time. In general, the system 500 shown here indicates a process and system that can be used at boot up to maintain security on a computing device, including a computing device that has a lightweight operating system. In this example, a binary blob is created by hashing each of the blocks of the file system, and the blob (in the form of the hashes for all of the components together) can be stored at the end of the file system (i.e., at the last point that is addressed during boot up). The kernel 504 in this example can be checked by the firmware 502 at boot up using the signature 508, and the kernel may in turn check each of the portions of the system data 506 using the hashes 510. To check the kernel, the firmware has a small read-only component where a public key is stored along with useful security recovery data. The key can check anything that comes after it in the boot path, and because it location is secure against attack, the entire system may be secure, and illegitimate changes to the system may be identified relatively quickly.

Figure 5B:
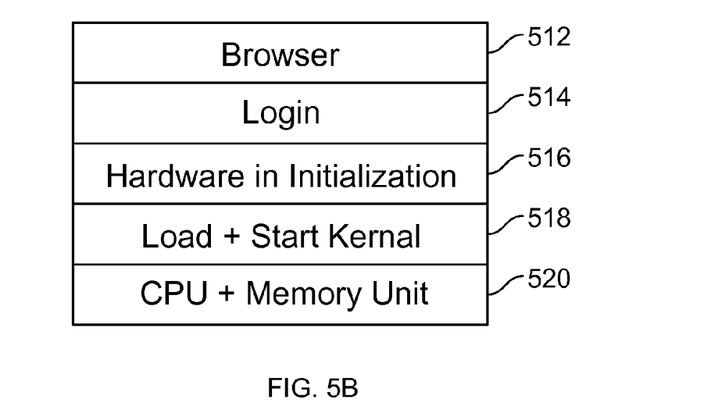
FIG. 5B shows a stack for a lightweight, web-based operating system.

FIG. 5B shows a stack for a lightweight, web-based operating system. In this example, there is initially CPU and memory initialization code 520 to get the device going and awake. There is then code to load and start the kernel 518, and to initialize the hardware 516. With the device actually operating, a login screen 514 may be shown on the device to that a user of the device may authenticate himself or herself. Finally is the browser, which may launch upon boot up, and may be assigned as the only application that is allowed as part of the system (as opposed to code that is downloaded to run inside the browser as a web application).

Figure 6A:
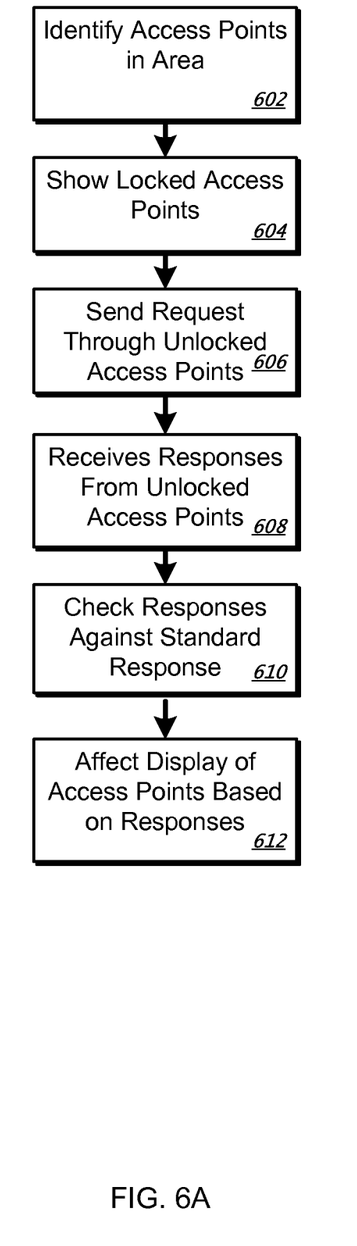
FIG. 6A is a flowchart of a process for identifying access points that may act as a proxy trap, before a user needs to interact with such access points.

FIG. 6A is a flowchart of a process for identifying access points that may act as a proxy trap, before a user needs to interact with such access points. In general, the process involves identification of proxy traps by automatically attempting to send messages through available access points and determining whether an expected response to a message is received, so as to indicate that the message passed through the access point to a known destination on the internet, and was not blocked by a proxy trap.

The process begins at box 602, where a system identifies access points in an area around it, generally an area within the range of a wireless interface on a computing device on which the interface is mounted. Such a process may occur by standard WiFi or similar scanning techniques that are well known, and obtain the advertised properties from other nodes near a user, such as wireless access points that may provide a connection to the internet.

At box 604, the process shows locked access points. In particular, the scanning process may identify those access points that identify themselves or can be identified as requiring a password to access in any manner. Such access points can be shown on a display of the device with a lock icon on them so as to indicate that the user needs credentials even to begin communicating with such access points.

The process then continues at box 606, to send a request through each of the unlocked access points. Such access points may initially look like "good" free access points to the scanning operation because the access points will communicate with other nodes without requiring authentication. However, such access points may be backed by other components that mediate access to network resources and may require payment to do so. Such status may not be determined from a traditional network scan. To determine whether an open access point has such a problem, the device sends a request that is intended to be answered by some independent resource on the other side of the access point and its local system, such as a web site operated by a known third party that is not the party that operates the access point. A good example site is a 404 page from a large known network operator, that does not change often. At box 608, the device receives responses, including responses from the known network resources for access points that are not traps. The device can compare the received information to a stored version of the resource (e.g., make sure that some portion of text received in response to the request matches a portion of text known to be on the relevant target web site, but that is not easily matched by happenstance.) to determine whether the information received back from each unlocked access point came from a through-source or from part of the local network that operates the access point (e.g., a web page from a server that identifies the costs for a user to use the access point) (box 610).

Finally, at box 612, the process affects the display of access points based on the received responses. For example, a list of available access points may be shown to a user initially. Small lock icons may be added to access points initially determined in the scan to require credentials from a user. The system may then attempt to send messages through the remaining access points, and as proper information is returned (from beyond the access point's network, so as to show that it is an open access point) or improper information is returned (showing that the request never reached its destination on the public network), the icons for those access points may be supplemented with an image of a dollar sign or other appropriate image to indicate which access points were determined to be traps (e.g., dollar signs may be used because typically traps require monetary payment in return for network access).

Figure 6B:
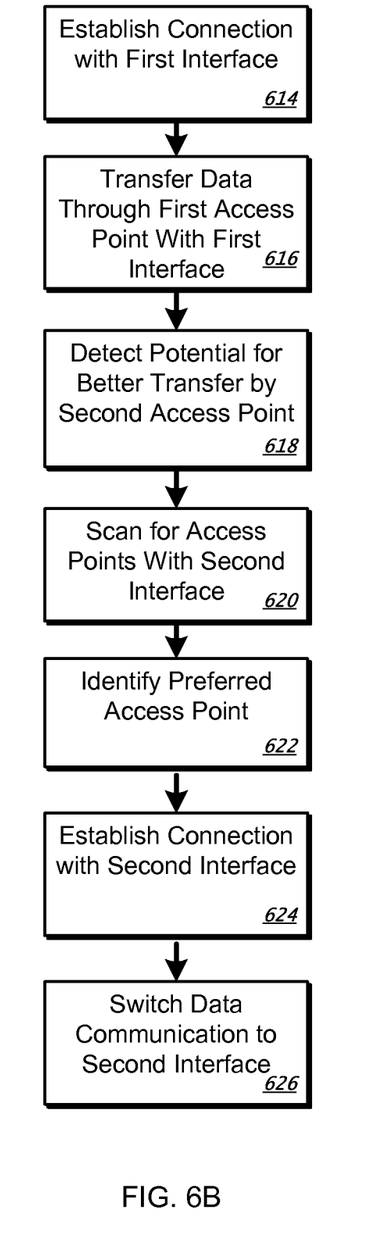
FIG. 6B is a flowchart of a process for obtaining content from an access point by a first physical network interface while scanning for other access points using a second physically separate interface.

FIG. 6B is a flowchart of a process for obtaining content from an access point by a first physical network interface while scanning for other access points using a second physically separate interface. In general, the process involves two different network interfaces on the same device operating simultaneously, with one performing connected standard data transfer, and the other performing scanning operations. Use of a second wholly separate interface, which may be a different semiconductor device, and even in a separate package, may permit the first interface to continue operating at full bandwidth even during scanning, instead of forcing it to slow its main data transfer so that it can also be tasked with scanning.

The process begins at box 614, where a connection is established using a first network interface device on a computing device. Such a connection may occur in a standard manner, by the interface device scanning in its reception area for other devices using the same protocol, and then displaying the candidate connections and waiting for a user to select one, or automatically connecting to a node that is determined automatically to be best.

At box 616, the process transfers data through the first access point and the first interface device. Again, such transfer may occur by conventional mechanisms, and may include transfer of information for generating pages on a web browser, streaming music or other media down from the internet, or similar operations.

At box 618, the process detects a potential for a better transfer of data by a second access point. Such a determination may be made by monitoring the strength of a signal from the first access point to the first interface device. As the user moves, the signal strength may start to fall, and at a certain distance may fall very quickly. If monitoring of the first interface indicates that the signal there is starting to fall, then the second interface device may be activated for scanning. Similarly, a second interface device may be actively scanning before any troubles are identified for the first interface device, and a system may constantly compared the strength of signals found by the second interface device to that being experienced by the first interface device. Also, the second interface (which is different from the first interface, but where both may be the same type of interface—i.e., each may operate according to the same standard or protocol, and may even be essentially identical to each other, such as two copies of the same chip model) may be used to identify less expensive connection options such as open and free access points (using the techniques discussed, e.g., in FIG. 6A), where the current access point is not open and free.

At box 620, the process scans for other available access points once a determination is made that the first access point could be substandard (though as just noted, the inactive interface device may always be scanning for better options). Such scanning may occur simultaneously with the first interface device continuing to give full-bandwidth data access to the device through the existing wireless connection.

At box 622, the device identifies a preferred access point. For example, if multiple access points are identified in the area of the interface device, those that require credentials may be rejected automatically, as may those determined to be proxy traps. A number of mechanisms may then be used to identify the best of the open access points that are available, and the second interface device may form a connection with that access point (box 624).

Finally, the second interface may take over the transfer of device data for the computing device and the first interface may take over the role previously served by the second interface, scanning for better connections (though a built-in delay on making changes after a change was recently made, may be employed to prevent a computing device from frequently switching between different access points). The process shown here may then repeat repeatedly as the interface devices switch roles back and forth.

Figure 7:
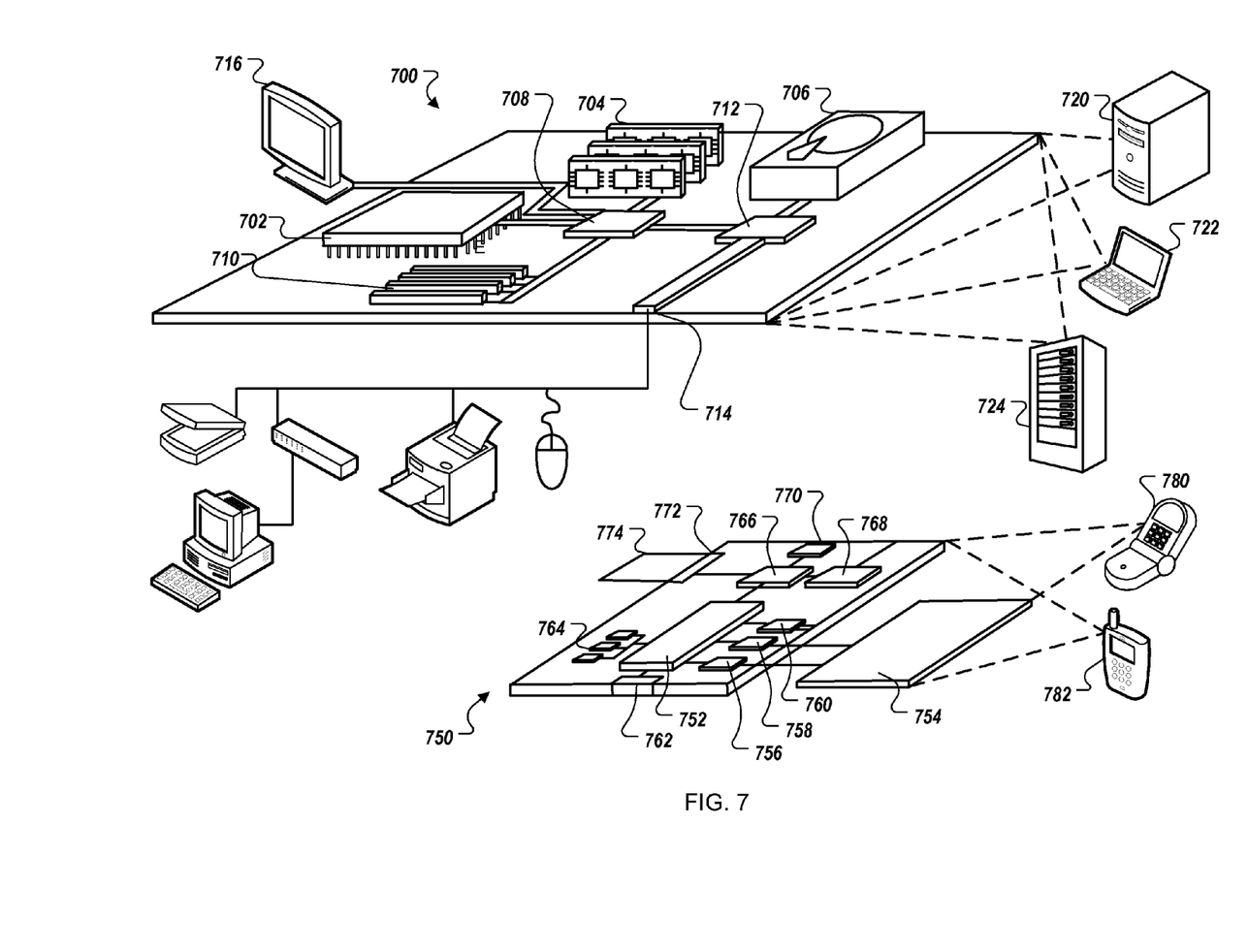
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:
1. A computer-implemented method comprising:
identifying a plurality of operable wireless network access points within communication range of a wireless device connected to a mobile computer;
determining that one or more first operable wireless network access points, from among the plurality of operable wireless network access points, are configured to permit the wireless device to wirelessly connect to the one or more first operable wireless network access points, but are also configured to trap the wireless device in a proxy so as to block the wireless device from accessing a publicly available network using the one or more first operable wireless network access points when the wireless device is wirelessly connected to the one or more first operable wireless network access points;

determining that one or more second operable wireless network access points, from among the plurality of operable wireless network access points, are configured to permit the wireless device to access the publicly available network using the one or more second operable wireless network access points when the wireless device is wirelessly connected to the one or more second operable wireless network access points; and displaying representations of particular ones of the one or more second operable wireless network access points in a list of prospective wireless network access points, while suppressing a display of representations of the one or more first operable wireless network access points in the list as a result of a determination that the one or more first operable wireless network access points are configured to trap the wireless device in a proxy.

2. The method of claim 1, wherein identifying the plurality of operable wireless network access points comprises simultaneously connecting to two different wireless network access points using different communication chip cores on the mobile computer.

3. The method of claim 1, further comprising determining whether a first access point from among the plurality of operable wireless network access points is configured to trap the wireless device in a proxy by sending a network request to the first access point and determining whether the request passed through the first access point to a resource on the publicly available network.

4. The method of claim 3, wherein the network request comprises an HTTP request to a known network site, and wherein determining whether the first access point is configured to trap the wireless device in a proxy comprises determining whether a response to the HTTP request is valid.

5. The method of claim 4, wherein the response to the HTTP request is determined to be valid based on the response including content that matches content known to exist at the known network site.

6. The method of claim 1, further comprising scanning the plurality of operable wireless network access points to identify access points that require user credentials to connect to the access points, wherein the one or more first operable wireless network access points and the one or more second operable wireless network access points are identified from the scanning as being access points that do not require user credentials to connect to the access points.

7. The method of claim 1, further comprising causing representations of the one or more first operable wireless network access points to be displayed in the list.

8. The method of claim 1, further comprising identifying one or more additional access limitations on at least some of the one or more second operable wireless network access points, and displaying on the mobile computer an indication that represents the identified one or more additional access limitations.

9. The method of claim 8, further comprising receiving a user input with respect to a representation of a particular access point in the list from among the one or more second operable wireless network access points, and displaying the indication that represents the identified one or more additional access limitations in response to receiving the user input.

10. The method of claim 1, wherein the device is programmed to receive a user input with respect to a displayed representation of a wireless network access point and to display detailed information about access restrictions on the wireless network access point in response to receiving the user input.

11. A computing device for selecting wireless network access points, the device comprising:
a wireless interface having circuitry for identifying a plurality of operable wireless network access points within communication range of the computing device;
a display manager arranged to cause a listing of one or more operable wireless network access points within communication range of the wireless interface to be outputted for display to a user of the computing device;
a request generator programmed to provide, through the wireless interface, a request to a resource on a publicly accessible network by providing the request to each of the plurality of operable wireless network access points within communication range of the computing device; and
a tester programmed to determine, using information received in response to the requests to the plurality of operable wireless network access points, which of the plurality of operable wireless network access points are arranged to trap a requesting party in a proxy so as to block the requesting party from accessing the publicly accessible network when the requesting party is connected to respective ones of the plurality of operable wireless network access points,
wherein the display manager is further arranged to suppress from the listing representations of a subset of the plurality of operable wireless network access points based on a determination that the subset of operable wireless network access points are each arranged to trap a requesting party in a proxy.

12. The device of claim 11, further comprising simultaneously connecting to two different operable wireless network access points using different communication chip cores on the computing device.

13. The device of claim 12, wherein one chip core is arranged to perform communications through one access point while another chip core scans for other available access points.

14. The device of claim 11, wherein the tester is programmed to generate a network request that comprises an HTTP request to a known network site, and to identify which of one or more operable wireless network access points is arranged to trap a requesting device in a proxy by determining whether a response to the HTTP request is valid.

15. The device of claim 14, wherein a response is determined to be valid if the response contains content known to exist at the known network site.

16. The device of claim 11, wherein the wireless interface is arranged to scan the plurality of operable wireless network access points to identify access points that require user credentials, and to send a non-scanning request only to access points identified as not requiring user credentials.

17. A computing device for selecting wireless network access points, the device comprising:
a wireless interface having circuitry for identifying a plurality of operable wireless network access points within communication range of the computing device;
a display manager arranged to cause a listing of one or more operable wireless network access points within communication range of the wireless interface to be outputted for display to a user of the computing device;
a request generator programmed to provide, through the wireless interface, a request to a resource on a publicly accessible network by providing the request to each of the plurality of operable wireless network access points within communication range of the computing device; and means for determining, using information received in response to the requests to the plurality of operable wireless network access points, which of the plurality of operable wireless network access points are arranged to trap a requesting party in a proxy so as to block the requesting party from accessing the publicly accessible network when the requesting party is connected to respective ones of the plurality of operable wireless network access points, wherein the display manager is further arranged to suppress from the listing representations of a subset of the plurality of operable wireless network access points based on a determination that the subset of operable wireless network access points are each arranged to trap a requesting party in a proxy.

18. The method of claim 1, wherein at least one of the one or more first operable wireless network access points that are determined to be configured to trap the wireless device in a proxy comprises a publicly-accessible wireless hotspot that requests payment information from wireless customers prior to granting the customers access to the publicly available network.

19. The method of claim 1, wherein the publicly available network comprises the internet.

20. One or more non-transitory computer-readable media having instructions stored thereon that, when executed by one or more processors, cause performance of operations comprising:

identifying a plurality of operable wireless network access points within communication range of a wireless device connected to a mobile computer;

determining that one or more first operable wireless network access points, from among the plurality of operable wireless network access points, are configured to permit the wireless device to wirelessly connect to the one or more first operable wireless network access points, but are also configured to trap the wireless device in a proxy so as to block the wireless device from accessing a publicly available network using the one or more first operable wireless network access points when the wireless device is wirelessly connected to the one or more first operable wireless network access points;

determining that one or more second operable wireless network access points, from among the plurality of operable wireless network access points, are configured to permit the wireless device to access the publicly available network using the one or more second operable wireless network access points when the wireless device is wirelessly connected to the one or more second operable wireless network access points; and displaying representations of particular ones of the one or more second operable wireless network access points in a list of prospective wireless network access points, while suppressing a display of representations of the one or more first operable wireless network access points in the list as a result of a determination that the one or more first operable wireless network access points are configured to trap the wireless device in a proxy.

\* \* \* \* \*